United States Patent [19]

Araki et al.

[11] Patent Number: 5,083,497
[45] Date of Patent: Jan. 28, 1992

[54] APPARATUS FOR PREVENTING WITHDRAWAL OF KEY MEMBER IN BRAKE BOOSTER

[75] Inventors: Shigeru Araki; Makoto Watanabe, both of Saitama, Japan

[73] Assignee: Jidosha Kiki Co., Ltd., Tokyo, Japan

[21] Appl. No.: 609,380

[22] Filed: Nov. 5, 1990

[51] Int. Cl.⁵ .............................................. F15B 9/10
[52] U.S. Cl. ................................................ 91/369.3
[58] Field of Search ........................... 91/369.1-369.4

[56] References Cited

U.S. PATENT DOCUMENTS

| | | | |
|---|---|---|---|
| 4,491,058 | 1/1985 | Morin | 91/369.3 |
| 4,512,237 | 4/1985 | Endoh et al. | 91/369 |
| 4,535,680 | 8/1985 | Takayama et al. | 91/369.2 |
| 4,619,185 | 10/1986 | Mori et al. | 91/369 |
| 4,787,292 | 11/1988 | Tsuyuki et al. | 91/369.3 |
| 4,813,336 | 3/1989 | Endo et al. | 91/369.4 |
| 4,862,787 | 9/1989 | Suzuki et al. | 91/369.2 |
| 4,882,980 | 11/1989 | Arino et al. | 91/369.2 |
| 5,005,464 | 4/1991 | Takaku | 91/369.2 |

FOREIGN PATENT DOCUMENTS

| | | | |
|---|---|---|---|
| 107945 | 7/1982 | Japan | 91/369.3 |
| 202968 | 11/1984 | Japan | 91/369.2 |
| 2095778A | 10/1982 | United Kingdom . | |

*Primary Examiner*—Edward K. Look
*Assistant Examiner*—F. Daniel Lopez
*Attorney, Agent, or Firm*—Flynn, Thiel, Boutell & Tanis

[57] ABSTRACT

A brake booster is disclosed. Specifically, an apparatus for preventing withdrawal of a key member, which is used to prevent the withdrawal of a valve plunger, forming a valve mechanism, from a valve body includes a retainer which prevents the withdrawal of the key member from the valve body. An insertion groove is formed in the valve body, and radially extending slits are formed in the end faces defined by the sides of the insertion groove. The retainer is formed with a locking portion, the free end of which is formed with an engaging portion, which is inserted into the slit to prevent an axial displacement of the free end of the locking portion. In this manner, the withdrawal of the key member from the valve is positively prevented.

5 Claims, 4 Drawing Sheets

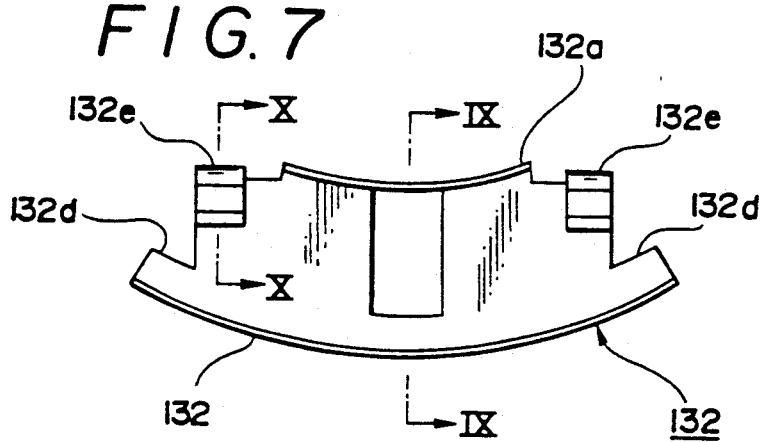
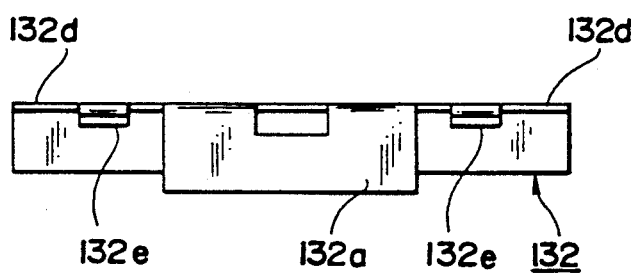
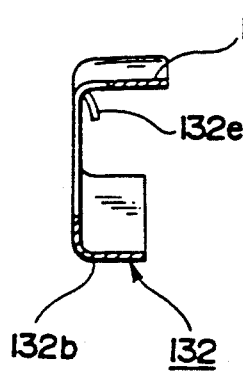
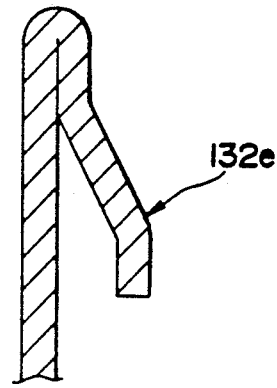

APPARATUS FOR PREVENTING WITHDRAWAL OF KEY MEMBER IN BRAKE BOOSTER

FIELD OF THE INVENTION

The invention relates to a brake booster, and more particularly, to an apparatus for preventing withdrawal of a key member used in a brake booster which comprises a key member for preventing the withdrawal of a valve plunger, forming a valve mechanism, from a valve body, and a retainer for preventing the withdrawal of the key member from the valve body.

DESCRIPTION OF THE PRIOR ART

In the prior art, an apparatus which prevents the withdrawal of a key member used in the brake booster comprises a valve body having a larger diameter portion which is disposed forwardly, as viewed in the direction of operation, and a smaller diameter portion which is located rearwardly, a groove defined in the stepped end face formed between the larger and the smaller diameter portion and extending radially of the valve body, an insertion opening extending from the groove radially inward of the valve body, a key member inserted into the opening and displaceable in the axial direction of the valve body and including a radially inner portion which engages a valve plunger of a valve mechanism and a radially outer portion which is bent rearwardly outside the opening so as to be capable of abutting against an inner wall surface of a shell, and a retainer for preventing the key member from being withdrawn from the insertion opening.

In an apparatus of the kind described, the retainer comprises a locking portion which covers the bent portion of the key member from the outside, an inner positioning portion which projects in both directions circumferentially from the outer portion of the locking portion for abutment against the valve body to block its radially inward movement, and an outer positioning portion disposed externally of the inner positioning portion and is surrounded by a bead formed around the inner periphery of a diaphragm which is mounted on the outer peripheral surface of the larger diameter portion of the valve body so that its radially outward movement is blocked.

Accordingly, the retainer is mounted on the valve body by having its outer positioning portion being surrounded by the bead extending around the inner periphery of the diaphragm with its inner positioning portion held in abutment against the valve body. The axial movement of the retainer is blocked by its friction against the valve body or diaphragm.

Normally, the retainer does not move if the key member is displaced axially in response to a back-and-fore movement of the valve plunger. However, if some force is exerted upon the key member for some reason which urges it outward, the bent portion of the key member will be strongly held in abutment against the locking portion of the retainer, and as the key member retracts under such condition, the locking portion will move integrally therewith. Under this condition, the retainer will rotate about an area of contact between the inner positioning portion and the valve body, whereby it will be disengaged from its sandwiched condition between the valve body and the bead extending around the inner periphery of the diaphragm, whereupon the key member will be also withdrawn from the valve body.

SUMMARY OF THE INVENTION

Accordingly, it is an object of the invention to prevent the withdrawal of the retainer from the valve body if some force acts upon the key member which urges it outward to cause the bent portion thereof to be strongly held in abutment against the locking portion of the retainer when the key member undergoes a retracting movement.

Specifically, the invention provides an apparatus for preventing withdrawal of a key member in a brake booster which is constructed in the manner mentioned above. In accordance with the invention, a radially extending slit is formed in the lateral end face of the groove, and the free end of the locking portion is formed with an engaging portion which is inserted into the slit to prevent an axial displacement of the free end.

With this construction, if some force acts upon the locking portion which urges it axially rearward, the engaging portion which is formed at the free end of the locking portion will be engaged with the slit to prevent an axial displacement of the free end of the locking portion. Accordingly, the retainer is prevented from rotating about an area of contact between the inner positioning portion of the valve body, thus preventing the withdrawal of the retainer from the valve body.

Above and other objects and features of the invention will become apparent from the following description of several embodiments thereof with reference to the attached drawings.

BRIEF DESCRIPTION OF THE DRAWINGS

FIG. 7 is a front view of a retainer 132 according to another embodiment of the invention;

FIG. 8 is a plan view of the retainer shown in FIG. 7;

FIG. 9 is a cross section taken along the line IX—IX shown in FIG. 7; and

FIG. 10 is an enlarged cross section taken along the line X—X shown in FIG. 7.

DETAILED DESCRIPTION OF EMBODIMENTS

Figure 1:
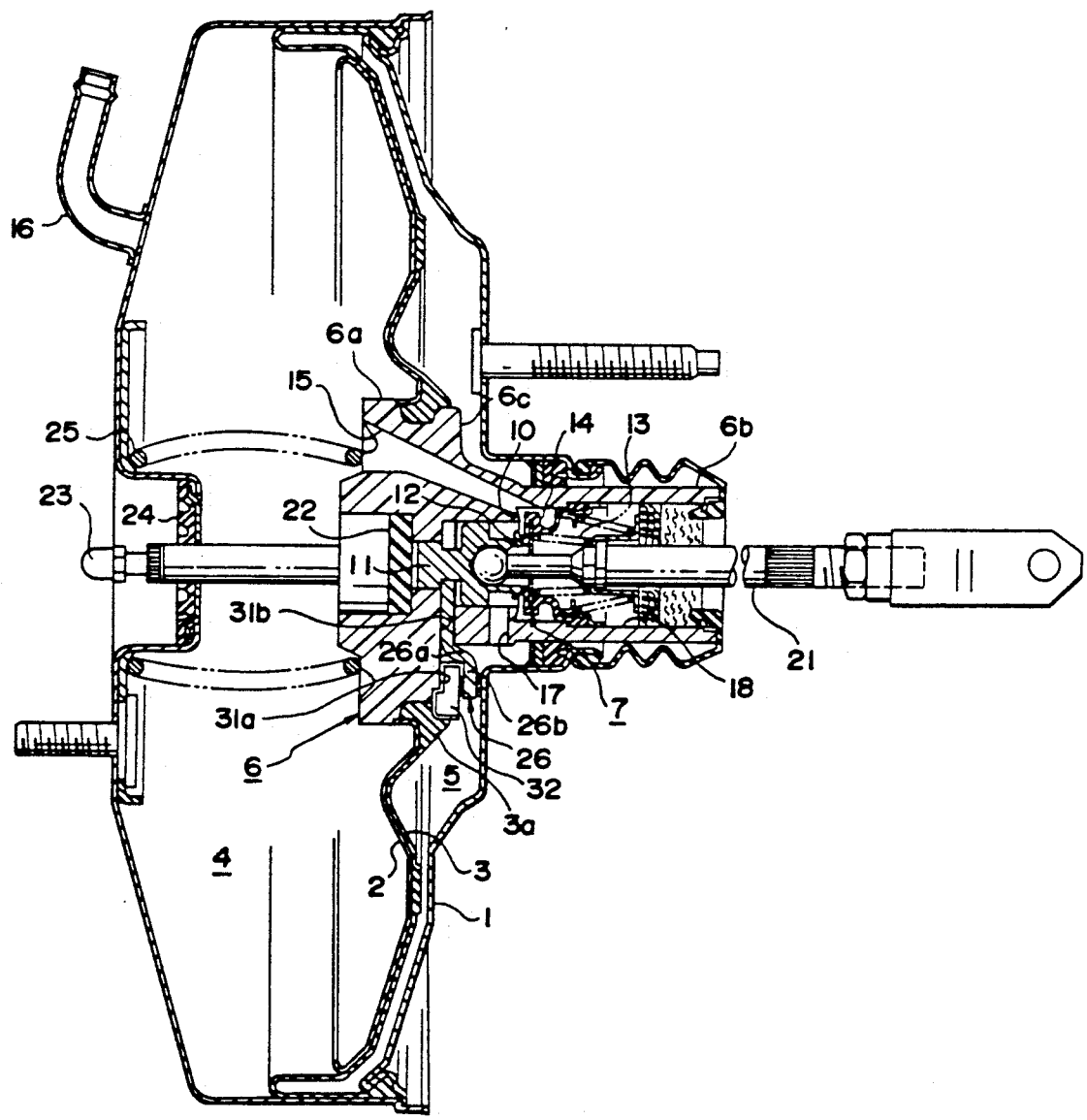
FIG. 1 is a longitudinal section, partly in side elevation, of one embodiment of the invention.

Referring to the drawings, several embodiments of the invention will now be described. Initially referring to FIG. 1, a brake booster is shown including a shell 1 in which a power piston 2 is slidably disposed. A diaphragm 3 is applied to the back surface of the power piston 2, and the combination of the power piston 2 and the diaphragm 3 divides the interior of the shell 1 into a forwardly located, constant pressure chamber 4 and a rearwardly located, variable pressure chamber 5. An axial portion of the power piston 2 is integrally formed with a valve body 6 which contains a valve mechanism 7 for switching a flow path.

The valve mechanism 7 comprises a first valve seat 10 formed on the valve body 6, a second valve seat 12 formed on a valve plunger 11, and a valve element 14 which is adapted to be seated upon either valve seat 10 or 12 from the rear side of the power piston 2, or from the right-hand side, as viewed in FIG. 1, under the resilience of a spring 13. A space located radially outward of a seal defined by the first valve seat 10 and the valve element 14 communicates with the constant pressure chamber 4 through a passage 15 which is formed in the valve body 6. The interior of the constant pressure chamber 4 communicates with a source of negative pressure, such as an intake manifold of an engine, through a tubing 16 which is disposed on the shell 1 for introducing a negative pressure.

On the other hand, a space located between seals defined between the first valve seat 10 and the valve element 14 and between the second valve seat 12 and the valve element 14, respectively, communicates with the variable pressure chamber 5 through a radially extending passage 17 formed in the valve body 6. A space located radially inward of a seal defined between the second valve seat 12 and the valve element 14 communicates with the atmosphere through an atmospheric passage 18.

The valve plunger 11, which forms the valve mechanism 7, is connected to an input shaft 21 which is mechanically coupled to a brake pedal, not shown. The free end of the valve plunger 11 is interlocked with a push rod 23 through a reaction disc 22 interposed therebetween, and the rod 23 extends through a seal member 24 to the outside of the shell 1 for connection with the piston of a master cylinder, not shown.

The power piston 2 and the valve body 6 are normally maintained in their inoperative position shown by a return spring 25. When in its inoperative position, the valve plunger 11 is engaged by a key member 26, which functions to prevent the withdrawal of the valve plunger 11 from the valve body 6 and which abuts against the inner wall surface of the shell 1 to limit a free movement to the right of the valve plunger 11 with respect to the valve body 6, so that when the input shaft 21 and the valve plunger 11 are operated for next time, the valve mechanism 7 immediately operates to switch a fluid circuit.

Figure 2:
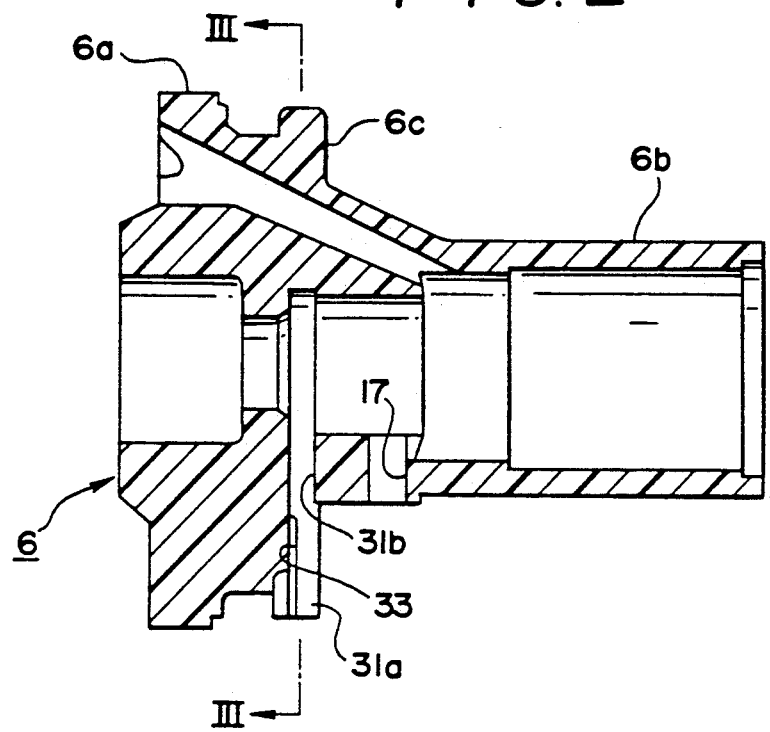
FIG. 2 is a cross section of a valve body 6 shown in FIG. 1.
Figure 3:
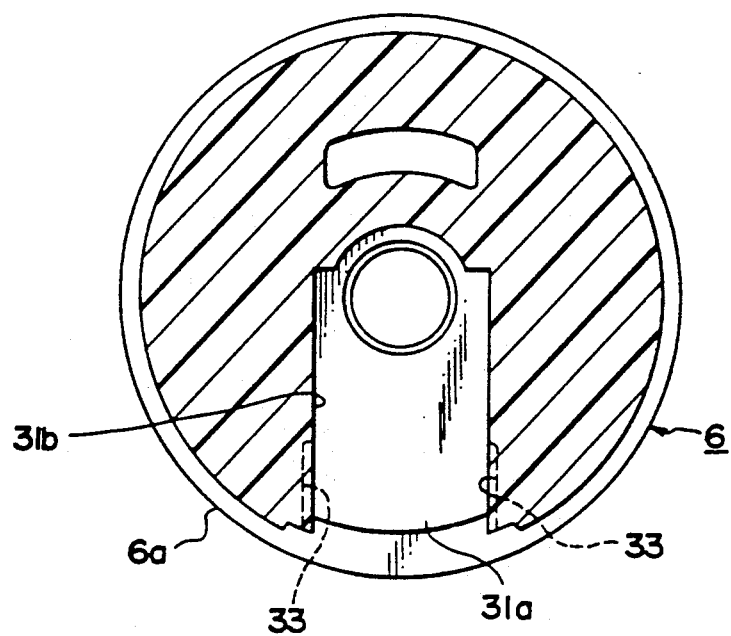
FIG. 3 is a cross section taken along the line III—III shown in FIG. 2.

The valve body 6 includes a larger diameter portion 6a which is located forwardly, as viewed in a direction of its operation, and a smaller diameter portion 6b which is located rearwardly. As shown in FIGS. 2 and 3, a stepped end face 6c is defined between the larger and the smaller diameter portion 6a, 6b. An insertion groove 31a of a given width is formed in the end face 6c to extend radially of the valve body 6, and an insertion opening 31b is formed to extend radially inward of the valve body 6 in continuity with the groove 31a.

The key member 26 has a forked, radially inner portion which is inserted into the opening 31b to engage the valve plunger 11, as shown in FIG. 1, and a radially outer portion which is bent in the rearward direction outside the opening 31b to define a bend 26a, the bend 26a continuing with a radially extending portion to define an abutting portion 26b which abuts against the shell 1. While not shown, the abutting portion 26b is C-shaped so as to surround the outer periphery of the valve body 6.

The key member 26 is axially displaceable within the opening 31b in response to a back-and-fore movement of the valve plunger 11. In the inoperative condition of the brake booster as mentioned above, the C-shaped abutment 26b of the key member 26 abuts against the inner wall surface of the shell 1 to limit a retracting movement of the valve body 6 while at the same time limiting a retracting movement of the valve plunger 11 with respect to the valve body 6 to thereby maintain the valve plunger at its advanced position with respect to the valve body 6 so that when the input shaft 21 and the valve plunger 11 are operated for the next time, a switching action of the fluid circuit by the valve mechanism 7 occurs immediately.

Figure 4:
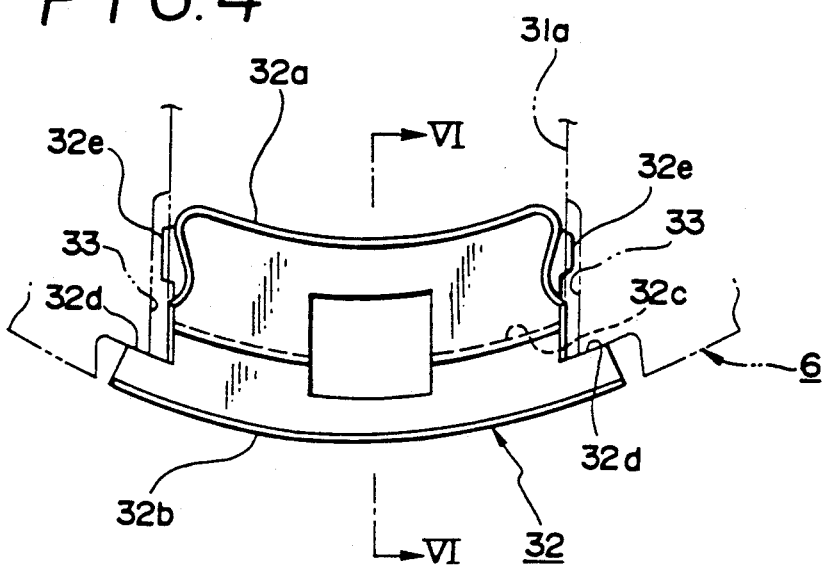
FIG. 4 is a front view of a retainer 32 shown in FIG. 1.
Figure 5:
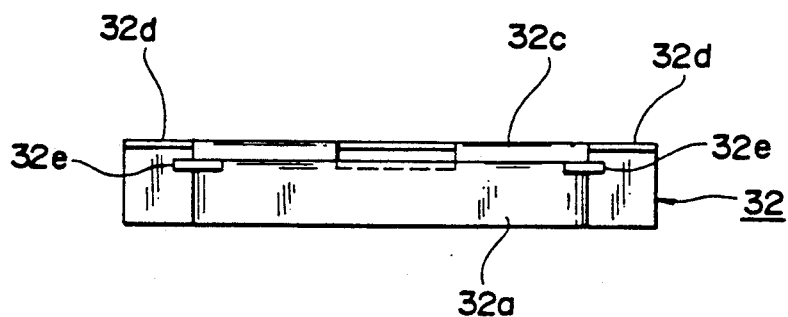
FIG. 5 is a plan view of the retainer shown in FIG. 4.
Figure 6:
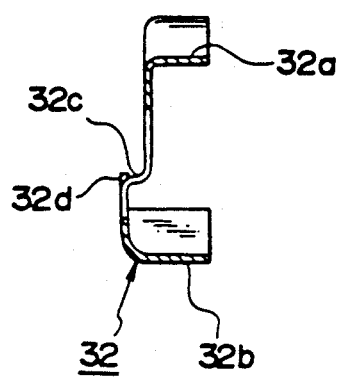
FIG. 6 is a cross section taken along the line VI—VI shown in FIG. 4.

A retainer 32 functions to block the key member 26 from being withdrawn from the insertion opening 31b, and comprises a rigid non-planar piece of plate material as shown in FIGS. 4 to 6. Specifically, the rigid non-planar piece of plate material is disposed radially of the valve body, and both its radially inner and outer portions are bent to extend rearwardly and generally in a concentric arcuate configuration. The radially inner portion defines a locking portion 32a and a radially outer portion defines an outer positioning portion 32b.

Intermediate its locking portion 32a and the positioning portion 32b, the rigid non-planar piece of plate material is formed with an arcuate step 32c, and the outer positioning portion 32b externally extends in opposite directions circumferentially in the form of a T, and the radially inside of these projecting portions defining inner positioning portions 32d.

Toward its radially inner end, the locking portion 32a is formed with a pair of circumferentially projecting engaging portions 32e on its both lateral sides, and these engaging portions 32e are engageable with radially extending slits 33 which are formed in the opposing end faces of the insertion groove 31a.

When assembling the key member 26 and the retainer 32, the radially inner portion of the key member 26 is initially inserted into the insertion opening 31b, with its forked portion engaged with the valve plunger 21. The inner positioning portions 32d of the retainer 32 are then disposed in abutment against the valve body 6 on the opposite sides of the insertion groove 31a while inserting the engaging portions 32e, which are formed on the both lateral sides of the retainer 32, into the slits 33. The diaphragm 3 is attached to the outer peripheral surface of the larger diameter portion 6a of the valve body 6 under this condition, with the bead 3a extending around its inner periphery covering the outer positioning portions 32c of the retainer 32, whereby the retainer 32 has its inner and outer positioning portions 32d and 32c held between the valve body 6 and the bead 3a extending around the inner periphery of the diaphragm 3 to be secured to the valve body 6. The locking portion 32a of the retainer 32 covers the bent portion 26a of the key member 26 from the outside under this condition, whereby the key member 26 is allowed to be displaced axially while its withdrawal from the insertion opening 31b is blocked.

If, for some reason, a force acts upon the key member 26 to urge it outward until the bent portion 26a of the key member 26 is strongly held in abutment against the locking portion 32a of the retainer 32 and if the key member 26 is displaced to the right under this condition, the retainer 32 will tend to rotate about a point of contact between the inner positioning portion 32d and the valve body 6. However, the engaging portions 32e at the end of the retainer 32 which are inserted into the slit 33 formed in the valve body 6 are effective to prevent such rotation of the retainer 32, thus preventing a resulting rotation of the retainer 32 which would otherwise occur to be disengaged from its sandwiched condition between the valve body 6 and the bead 3a to be withdrawn from the valve body 6, thereby allowing the key member 26 to be withdrawn from the valve body 6.

FIGS. 7 to 10 show another embodiment of the invention. Specifically, a retainer 132 in this embodiment includes a locking portion 132a, an outer positioning portion 132b, an inner positioning portion 132d and an engaging portion 132e in the similar manner as the retainer 32 of the previous embodiment, but is devoid of the step 32c.

As shown in FIG. 10, the engaging portion 132e is formed by folding back part of the rigid non-planar piece of plate material which defines the retainer 132 to impart a resilience thereto, with its tip end projecting rearwardly to abut against the inner surface of a slit formed in the valve body, thus preventing the withdrawal of the retainer 132 in the radially outward direction. This arrangement again achieves the function and effect as achieved by the first embodiment.

While the invention has been described above in connection with several embodiments thereof, it should be understood that the above disclosure is exemplary only, and that a number of changes, modifications and substitutions therein will readily occur to one skilled in the art from the described arrangements.

What is claimed is:

1. An apparatus for preventing withdrawal of a key member in a brake booster including a valve body having a larger diameter portion which is located forwardly and a smaller diameter portion which is located rearwardly, as viewed in the direction of operation thereof, an insertion groove formed in a stepped end face defined between the larger and the smaller diameter portion to extend radially of the valve body, an insertion opening continuing from the insertion groove and extending radially inward of the valve body, the key member being inserted into the insertion opening so as to be displaceable in the axial direction of the valve body, the key member including a radially inner portion which engages a valve plunger of a valve mechanism and a radially outer portion which is bent rearwardly at a point outside of the insertion opening so as to be capable of abutting against an inner wall surface of a shell, and a retainer for preventing the withdrawal of the key member from the insertion opening, the retainer including a locking portion which covers the bent portion of the key member from a radially outer side, an inner positioning portion which projects in opposite directions circumferentially from an outer portion of the locking portion for abutment against the valve body to prevent radially inward movement of said retainer, and an outer positioning portion disposed outwardly of the inner positioning portion and covered by a bead extending around the inner periphery of a diaphragm which is attached to an outer peripheral surface of the larger diameter portion of the valve body so as to be incapable of moving radially outward;

characterized in that a radially extending slit is formed in a side surface of the insertion groove, the locking portion being formed with an engaging portion which is disposed adjacent an end of the locking portion and inserted into the slit to prevent an axial displacement of the end of the locking portion, the retainer comprising a rigid non-planar piece of plate material which is disposed radially of the valve body and which has a radially inner portion and a radially outer portion, both of which are bent rearwardly in a concentric arcuate configuration, the radially inner portion defining the locking portion and the radially outer portion defining the outer positioning portion, said end of the locking portion being a radially inner end of the locking portion, and the engaging portion projects circumferentially from opposite sides of the locking portion adjacent said radially inner end thereof.

2. An apparatus according to claim 1 in which the radially inner portion of the key member which engages the valve plunger has a forked configuration, the radially outer portion of the key member including a bent portion which is bent rearwardly at a point outside of the insertion opening, and an abutment which is bent radially outward from the bent portion for abutment against the shell, the abutment being C-shaped so as to surround the periphery of the valve body.

3. An apparatus according to claim 1 in which the retainer includes an arcuate step intermediate the inner locking portion and the outer positioning portion.

4. An apparatus according to claim 1 in which the outer positioning portion of the retainer includes parts which project in opposite directions circumferentially to form with said locking portion a T-shaped structure, the projecting parts having radially inner portions which define the inner positioning portion.

5. An apparatus for preventing withdrawal of a key member in a brake booster including a valve body having a larger diameter portion which is located forwardly and a smaller diameter portion which is located rearwardly, as viewed in the direction of operation thereof, an insertion groove formed in a stepped end face defined between the larger and the smaller diameter portion to extend radially of the valve body, an insertion opening continuing from the insertion groove and extending radially inward of the valve body, the key member being inserted into the insertion opening so as to be displaceable in the axial direction of the valve body, the key member including a radially inner portion which engages a valve plunger of a valve mechanism and a radially outer portion which is bent rearwardly at a point outside of the insertion opening so as to be capable of abutting against an inner wall surface of a shell and a retainer for preventing the withdrawal of the key member from the insertion opening, the retainer including a locking portion which covers the bent portion of the key member from a radially outer side, an inner positioning portion which projects in opposite directions circumferentially from an outer portion of the locking portion for abutment against the valve body to prevent radially inward movement of said retainer, and an outer positioning portion disposed outwardly of the inner positioning portion and covered by a bead extending around the inner periphery of a diaphragm which is attached to an outer peripheral surface of the larger diameter portion of the valve body so as to be incapable of moving radially outward;

characterized in that a radially extending slit is formed in a side surface of the insertion groove, the locking portion being formed with an engaging portion which is disposed adjacent an end of the locking portion and inserted into the slit to prevent an axial displacement of the end of the locking portion, the retainer comprising a rigid non-planar piece of plate material which is disposed radially of the valve body and which has a radially inner portion and a radially outer portion, both of which are bent rearwardly in a concentric arcuate configuration, the radially inner portion defining the locking portion and the radially outer portion defining the outer positioning portion, said end of the locking portion being a radially inner end thereof, the engaging portion of the retainer is formed on both lateral sides of the locking portion adjacent to said radially inner end, a resilience being imparted to the engaging portion because the engaging portion is formed by folding back the a part of the rigid non-planar piece of plate material, and a free end of the engaging portion projecting rearwardly for abutment against an inner surface of the slit which is formed in the valve body.

* * * * *

UNITED STATES PATENT AND TRADEMARK OFFICE
CERTIFICATE OF CORRECTION

PATENT NO. : 5 083 497
DATED : January 28, 1992
INVENTOR(S) : Shigeru ARAKI et al It is certified that error appears in the above-identified patent and that said Letters Patent is hereby corrected as shown below:

Column 6, line 42; change "of a shell" to ---of a shell,"

Signed and Sealed this

Thirteenth Day of April, 1993

*Attest:*

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 5 083 497
DATED : January 28, 1992
INVENTOR(S) : Shigeru ARAKI et al It is certified that error appears in the above-identified patent and that said Letters Patent is hereby corrected as shown below:

Column 6:

Claim 2, line 10; delete "a bent".
        line 11; delete in its entirety.
        line 12; delete "the insertion opening, and".

Signed and Sealed this

Eighth Day of June, 1993

Attest:

MICHAEL K. KIRK

*Attesting Officer*     *Acting Commissioner of Patents and Trademarks*